(No Model.) 3 Sheets—Sheet 1.

J. P. MOORE.
CIRCULAR SAW MILL.

No. 341,678. Patented May 11, 1886.

WITNESSES: INVENTOR:
J. P. Moore
BY Munn & Co
ATTORNEYS.

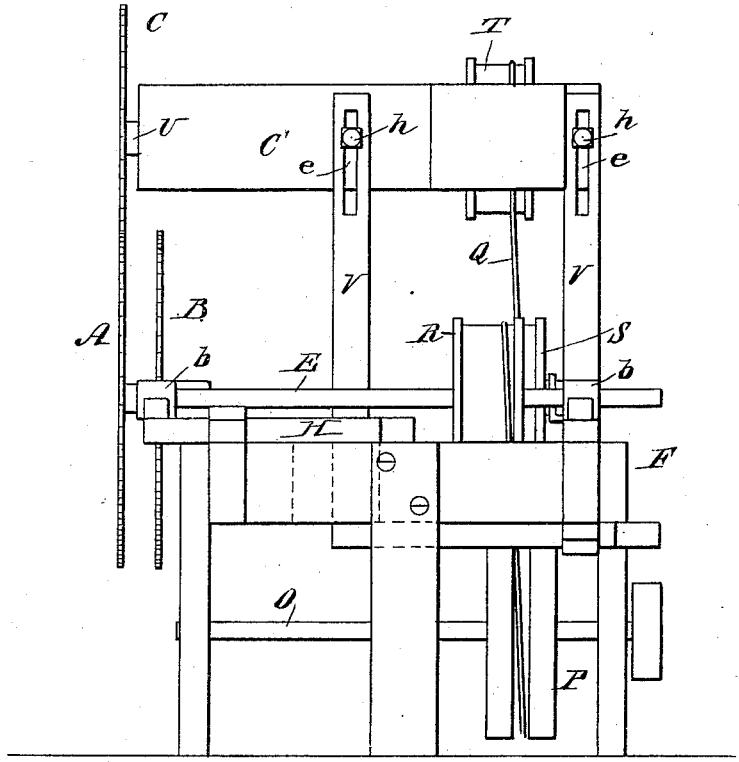
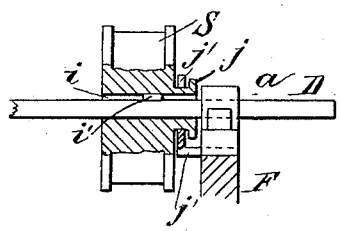

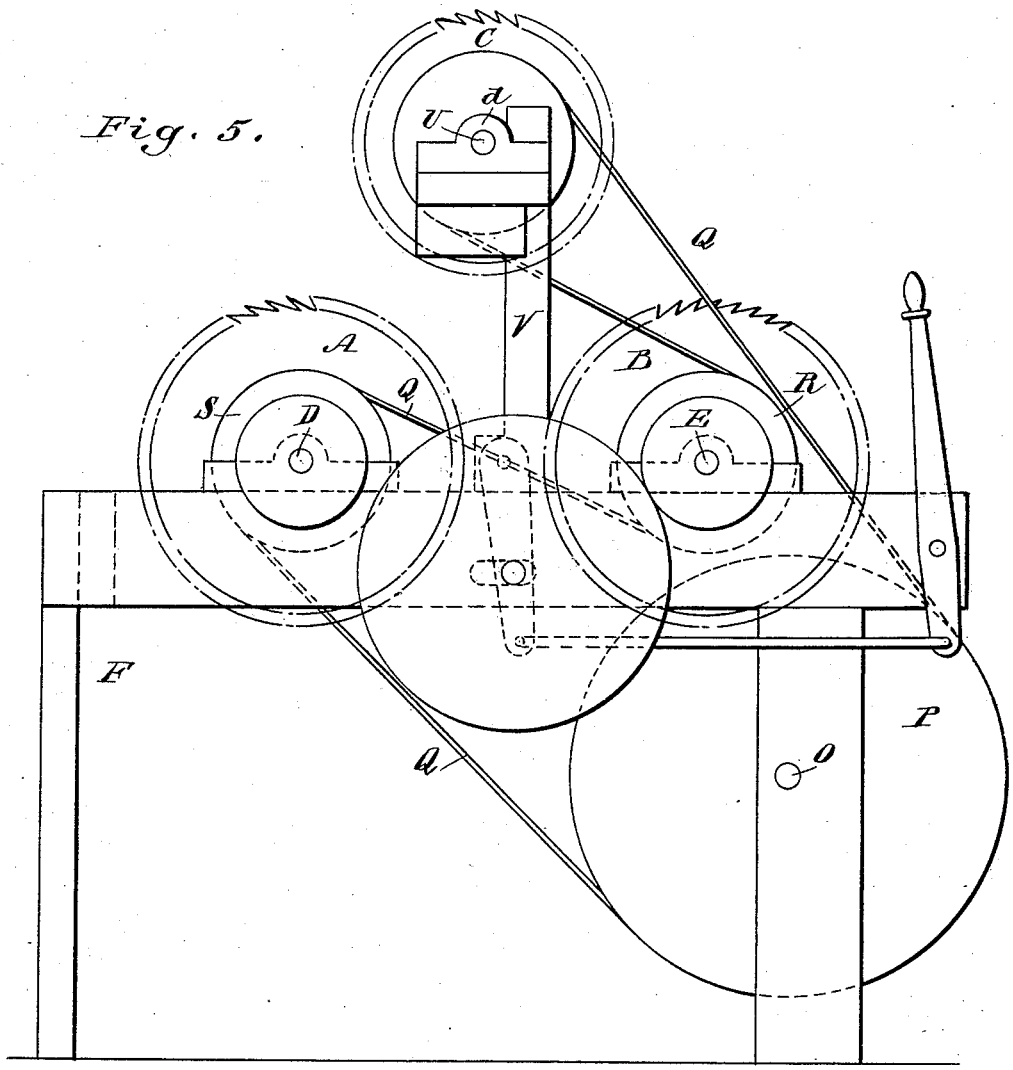

UNITED STATES PATENT OFFICE.

JOHN P. MOORE, OF SNOW HILL, MARYLAND.

CIRCULAR-SAW MILL.

SPECIFICATION forming part of Letters Patent No. 341,678, dated May 11, 1886.

Application filed February 17, 1886. Serial No. 192,217. (No model.)

*To all whom it may concern:*

Be it known that I, JOHN P. MOORE, of Snow Hill, in the county of Worcester and State of Maryland, have invented a new and Improved Saw-Mill, of which the following is a full, clear, and exact description.

This invention pertains to improvements in circular-saw mills; and it consists of the combinations of parts, including their construction, substantially as hereinafter described, and pointed out in the claims.

Reference is to be had to the accompanying drawings, forming a part of this specification, in which similar letters of reference indicate corresponding parts in all the figures.

Figure 1:
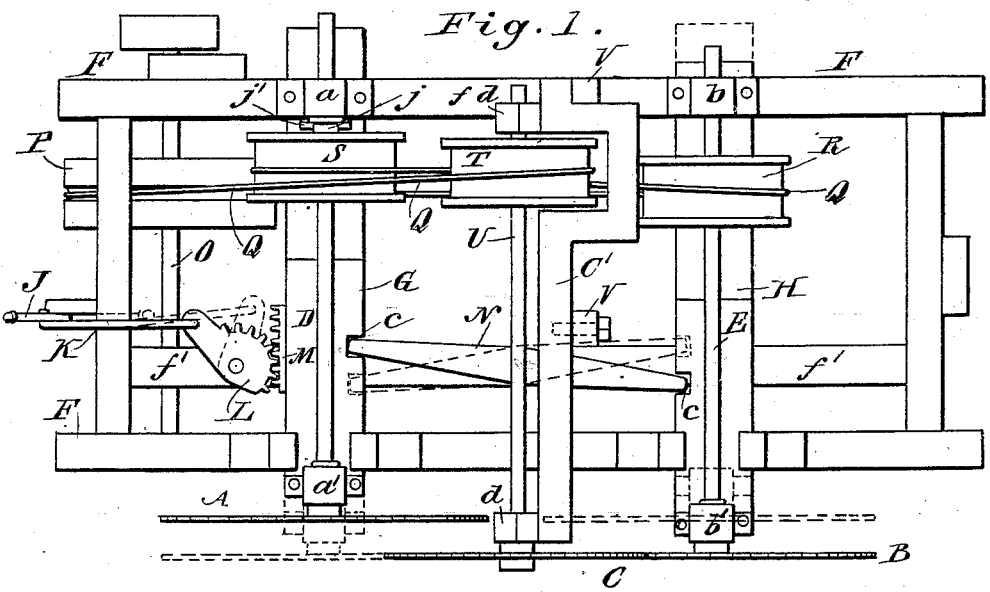
Figure 2:
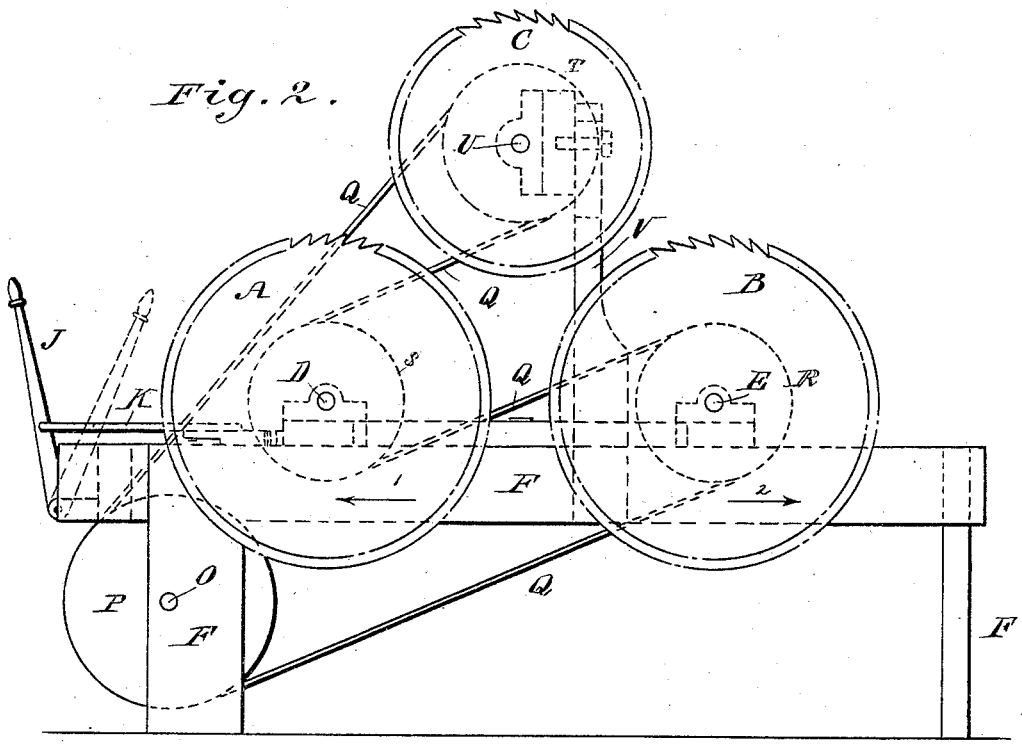

Figure 1 is a plan view of a saw-mill having two shifting circular saws and a top saw. Fig. 2 is a side elevation of the same. Fig. 3 is an end elevation of the same. Fig. 4 is a detailed sectional view showing the attachment of one of the pulleys. Fig. 5 is a side elevation of a modification, wherein the two main saws always stand in the same plane with each other and revolve in opposite directions.

A B represent the two main saws of the mill, and C represents the top saw.

In the form of machine shown in Figs. 1, 2, and 3, the saws A B are secured, respectively, upon the shafts D E, which are adapted to be moved longitudinally in their bearings for shifting the saws A B to and from the main frame F of the machine, for putting said saws alternately in position for action. The shaft D is held at one end in the bearing *a*, secured to the side piece, *f*, of the main frame F, and at the other in the bearing *a'*, secured to the heavy bar G, which is adapted to slide endwise in the main frame of the machine, for shifting the shaft D and saw A attached to it. The shaft E is held at one end in the bearing *b*, secured to the side piece, *f*, of the frame F, and at the other in the bearing *b'*, attached to the heavy bar H, which, like the bar G, is adapted to be moved endwise in the main frame F, for shifting the shaft E and the saw B.

For moving the bar G, I employ the lever J, connecting-rod K, and toothed segment L, which latter is pivoted upon the beam *f'* of the frame of the machine and meshes with the rack M, attached to or formed upon the bar G, so that by operating the lever J the segment will move the bar G in either direction. The bar H, if desired, might be operated by separate mechanism; but I prefer to operate it from the bar G by the centrally-fulcrumed lever N, which engages at its ends with the bars G H, so the movement of the bar G will simultaneously move the bar H in the opposite direction.

Recesses *c c* are formed in the inner edges of the bars G H, to receive the ends of the lever N, as shown in Fig. 1.

O is the drive-shaft, on which is secured the pulley P, over which passes the belt Q, which passes from said pulley P over the pulley R on the shaft E, thence over the pulley S on shaft D, and thence over the pulley T, secured upon the upper shaft, U, which carries the top saw, C. In this manner of applying the belt Q the saws A B are revolved in opposite directions, both toward the center of the machine and in the form of machine shown in Figs. 1, 2, and 3. The teeth of both saws A B are pitched toward the center of the machine, so the saw A will act when the log is carried in the direction of arrow 1, and the saw B when the log is carried in the direction of arrow 2.

While the saw A acts the saws A B will occupy the positions shown in dotted lines in Fig. 1, and while the saw B acts the saws will occupy the positions shown in full lines in said figure.

In the form of machine shown in Fig. 5, the saws A B are not shifted to and from the frame, but run at all times in the same plane with each other, and their teeth are pitched in opposite directions, outward toward the ends of the machine, and they are revolved in opposite directions away from each other, each in the direction of the pitch of its teeth, so that they will cut in opposite directions to enter the log as it is moved back and forth by the traverse motion of the log-carriage.

The top saw, C, in the form of machine shown in Fig. 5 runs in the same plane with both saws A B, but in the form of machine shown in Figs. 1, 2, and 3 runs in the same plane with the saw that is moved out for action. The shaft U, that carries the top saw, C, is journaled in the bearings *d d*, attached to the bent cross-piece C', which is attached to the uprights V V', attached to the main frame of the machine, and the said uprights V V' are slotted, as shown at *e e*, for the passage of the bolts h h, that fasten the bar C' to the uprights, so that by loosening these bolts the bar C' may be adjusted for properly situating the top saw, C, and also for tightening the belt Q.

The pulley R is made fast to the shaft E and moves with it when the shaft is shifted for shifting the saw B, but the shaft D, when moved longitudinally, slides through the pulley S, which is connected to the shaft by a feather and groove, i i', as shown in Fig. 4. The pulley is formed at its outer surface with the collared projection j, which enters the claw j', attached to the main frame F, so the claw holds the pulley from sliding with the shaft D.

Having thus fully described my invention, I claim as new and desire to secure by Letters Patent—

1. The shaft carrying a saw and sliding in a fixed bearing at one end, and held at its other end in a bearing secured to an endwise movable bar, in combination with a second shaft sliding in a fixed bearing at one end and held at its other end in a bearing, also secured to an endwise movable bar, and the centrally-pivoted lever engaging with said movable bars to shift the same in opposite directions, substantially as and for the purpose set forth.

2. The shaft D, carrying the saw A, and held in a fixed bearing at one end and at the other end in a bearing attached to the sliding bar G, in combination with the sliding bar H, connecting-lever N, shaft E, saw B, lever J, connected to a toothed segment, L, engaging with a rack on the bar G, substantially as and for the purpose set forth.

3. The shaft D, carrying the saw A, and held in a fixed bearing at one end and at the other end in a bearing attached to the sliding bar G, the sliding bar H, connecting-lever N, shaft E, and saw B, said bar G being endwise movable, in combination with the shaft U, carrying top saw, C, and held in bearings d, attached to the bar c', adjustably attached to the uprights V, together with driving pulleys and belts, substantially as and for the purpose specified.

4. The shaft U, carrying top saw, C, and held in bearings d, attached to the bar C', adjustably attached to the uprights V, in combination with the pulley T, and pulleys S R on shafts D E, the drive-pulley P, and the belt Q, whereby the belt may be tightened by adjusting the shaft U, substantially as described.

JOHN P. MOORE.

Witnesses:
GEORGE S. RICHARDSON,
MARVIN T. HARGIS.